United States Patent [19]

Lecourt et al.

[11] Patent Number: 4,871,385

[45] Date of Patent: Oct. 3, 1989

[54] PROCESS AND DEVICE FOR COOLING OF SHEETS OF BENT GLASS SO AS TO PRODUCE EDGE STRESSES

[75] Inventors: Jean Lecourt, Paris, France; Desire Legros, Jemeppe; Andre Granville, Auvelais, both of Belgium

[73] Assignee: Saint-Gobain Vitrage, Courbevoie, France

[21] Appl. No.: 286,859

[22] Filed: Dec. 20, 1988

[30] Foreign Application Priority Data

Dec. 22, 1987 [FR] France .............................. 87 17885

[51] Int. Cl.$^4$ ............................................. C03B 27/04
[52] U.S. Cl. ..................................... 65/115; 65/103; 65/104; 65/114; 65/348; 65/273
[58] Field of Search ................. 65/103, 104, 115, 273, 65/374.12, 114, 348

[56] References Cited

U.S. PATENT DOCUMENTS

| | | | |
|---|---|---|---|
| 2,298,709 | 10/1942 | Long | 65/348 |
| 3,364,006 | 1/1968 | Newell et al. | 65/103 X |
| 3,393,062 | 7/1968 | Hesten et al. | 65/115 |
| 3,396,001 | 8/1968 | Baker | 65/103 X |
| 3,429,682 | 2/1969 | Baker | 65/104 X |

*Primary Examiner*—Arthur Kellogg
*Attorney, Agent, or Firm*—Oblon, Spivak, McClelland, Maier & Neustadt

[57] ABSTRACT

Compression stresses are formed on the periphery of a glass sheet by blowing cooling air on the periphery of the heated glass sheet. The cooling air is blown by using a pyramidal deflector to deflect air flow radially outward toward the edges of the glass sheet. By adjusting the spacing between the deflector and the glass sheet, the size of a central, relatively quiescent, zone can be adjusted. The air flow is provided by a duct which can include a pyramidal skirt which surrounds the deflector to form a gas flow path whose size controls the cooling rate. Pyramidal flaps within the gas flow path can be used for adjusting cooling gas pressures.

16 Claims, 2 Drawing Sheets

U.S. Patent    Oct. 3, 1989    Sheet 1 of 2    4,871,385
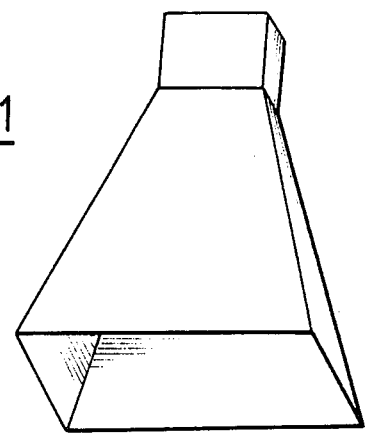
FIG_1
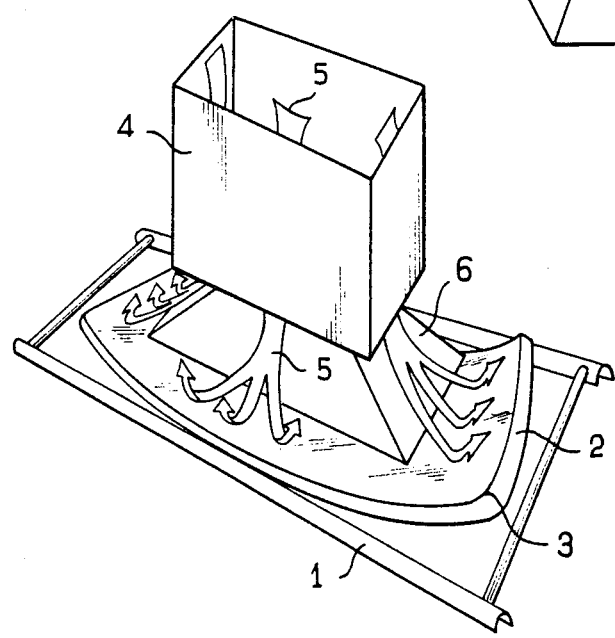
FIG_2
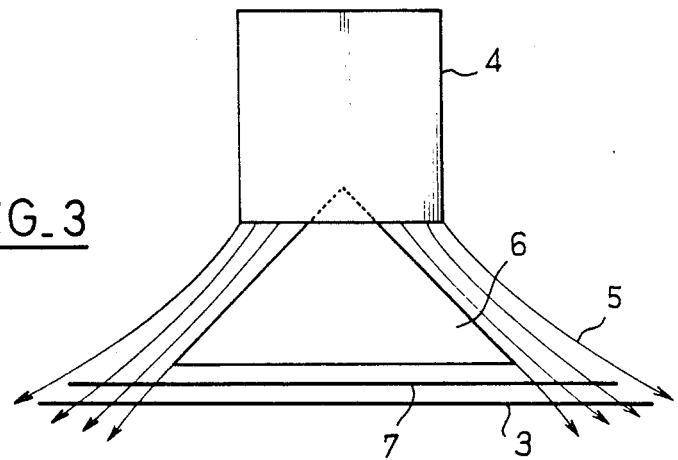
FIG_3

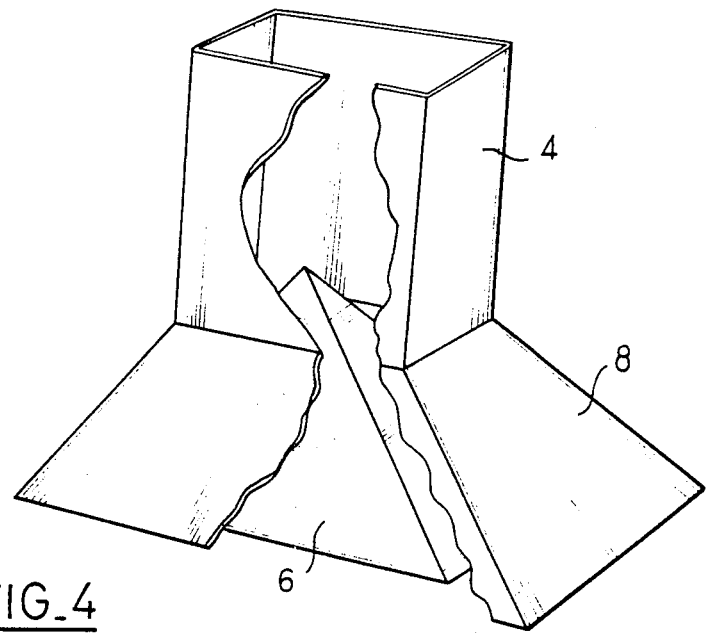
FIG_4
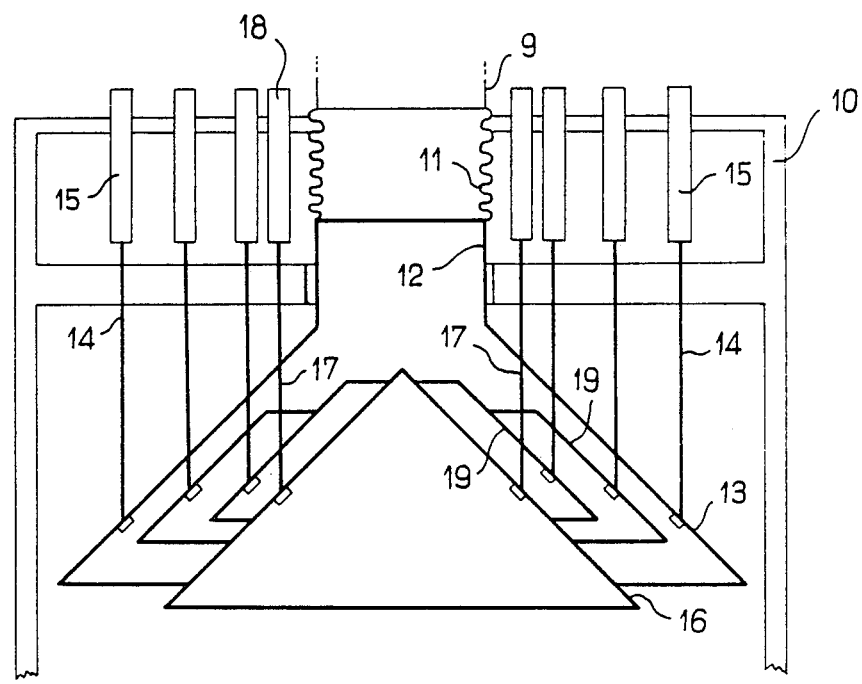
FIG_5

PROCESS AND DEVICE FOR COOLING OF SHEETS OF BENT GLASS SO AS TO PRODUCE EDGE STRESSES

BACKGROUND OF THE INVENTION

1. Field of the Invention:

The invention relates to the techniques of cooling glass sheets after they have been heated, in particular for bending them.

2. Background of the Related Art:

When it is desired to give a glass sheet a nonplanar shape, for example during the manufacture of an automobile glazing, the planar sheet is brought to a temperature higher than the glass transformation temperature, deformation is caused either by stressing the malleable glass to assume a rigid shape, or by positioning it horizontally and allowing it to become deformed under its own weight. Once the desired shape is obtained, a controlled cooling of the glass is carried out. The most recently employed cooling processes are tempering and annealing.

The first, which general comprises energetically blowing on the glass, provides it, once cooled, with a prestressed state which increases its resistance to bending and thermal shock. This process is used typically for manufacturing of glazings which are to equip the sides or the rear of automobiles.

In annealing, on the other hand, the relaxation of stresses, is permitted by cooling the glass in a very gradual manner. In this case, an annealed glass is obtained whose stress level is slight in the direction of the thickness of the glass, which optionally allows the finished product to be cut and which, in the case of an automobile glazing, avoids explosive breakage in case by an impact of fine gravel. This technique is therefore particularly adapted to the manufacturing of windshields.

Also known is a technique where two sheets of superimposed glass which are simultaneously heated, bent and cooled are then assembled in pairs with a plastic sheet inserted therebetween.

But an automobile windshield is subjected to handling conditions before its final assembly on the automobile production line, or in conditions of use after putting a vehicle on the road, which require a suitable mechanical performance. Annealed glass is fragile and it is advisable to limit the risks of breakage either at the time of assembly handling or when in the car, for example, breakage by thermal shock when hot air is blown on the inner surface of a cold windshield by the defogger or defroster.

A well-known process consists of moderately blowing on the periphery of the glass sheets at the beginning of the cooling process to create in this peripheral zone a slight compression prestressing which limits the risks of later breakage. Thus, for example, in the bending furnace for laminated glazings described in French patent application No. FR 87-16 083, there is positioned downstream from the cells where the bending of the glass is carried out by gravity, a blowing cell where, during the holding time of the glass, a cooling gas is blown on the peripheral zone of the sheet.

To carry out this blowing, blowing hoods are usually used which have a truncated pyramid shape. The air is guided by the walls of the hood and then escapes in a free passage between the edge of the hood and the glass. In the center, the air circulation is much slower: the heat exchange is therefore increased at the periphery.

To be fully satisfactory, this system requires that the dimensions of the glass sheet and the hood be adapted to each other. If it is desired to treat sheets of different dimensions with the same hood, satisfactory performance becomes difficult. In particular, for small-series cars or when the demand is very diversified as in the market for replacement products, it may be desired to alternate the production of different models. It would be necessary in this case to change the blowing hood when changing the model. This is not possible since the adaptation possibilities of a system having a given hood are slight. Only the flow of air can be varied, either by changing the pressure upstream from the hood or by varying the distance of the hood from the glass. But, in doing this the treated surface is also changed as is the distribution of air pressure on its surface. It is practically impossible under these conditions, and on models of different sizes and thicknesses, to master both the width of the prestressed zone on the entire periphery of the glass sheet and the value of its prestressing.

Novel system designs may be considered for carrying out the tempering of glass of varied dimensions. Thus European patent application No. EP 0 246 123 proposes the use of a box for adjustable blowing, where slide valves allow certain zones to be sealed. Such a device could be used for closing more of the central part of the box as the windshield becomes larger. But the mechanical controls of these systems are delicate and their operation in the cells, which are hot and difficult to access, would pose problems which the present invention makes it possible to avoid.

SUMMARY OF THE INVENTION

To solve the problem of adapting the blowing to different glazing dimensions, the invention proposes a process and apparatus where, instead of guiding the air only in a hood in the shape of a flared duct, a pyramidal deflector is put at the end of the hood which, while covering the central part of the glass sheet, allows the air to reach only its periphery. The pyramidal shape gives a precise direction to the air currents.

To adapt the blowing to the different glass sheets, the process of the invention provides that, by adjusting the distance between the deflector and the hot glass sheet, the periphery of the glass sheet is blown on preferentially to a more or less large central zone.

In a variant of the invention, in addition to the preceding pyramidal deflector, a duct of flared shape forms a skirt surrounding the deflector, this skirt advantageously being pyramidal like the deflector. By modifying the spacing of the flared duct and the deflector, the airflow and/or air speed can be modified.

In another form of the invention, airflow is directed more precisely between the skirt which bounds the duct and the deflector with the assistance of flaps parallel to the surfaces of the pyramidal deflector, these flaps being associated to form the pyramidal units. Several of these units can be used, and, in positioning them differently with respect to one another, the distribution of blowing pressures can be changed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a conventional blowing hood;

FIG. 2 shows a pyramidal deflector according to the invention;

FIG. 3 schematically shows the effect of variations of the deflector—glass sheet separation distance on the surface of the zone blown on;

FIG. 4 shows a deflector and a duct with its pyramidal skirt; and

FIG. 5 shows a blowing unit with a deflector, a duct and two flap units.

DETAILED DESCRIPTION OF THE PREFERRED EMBODIMENTS

FIG. 1 shows a blowing hood such as is usually used in the furnaces for bending glass sheets by gravity. In such furnaces, the glass sheets are carried flat on carriages by metal forms called "skeletons." The carriage allows the glass sheet to be moved step by step from one cell to another. The glass gradually heats up, becoming deformed under its own weight until, at its periphery, it assumes the shape of the skeleton. After bending, the glass is gradually cooled by transporting it to several cooling cells while avoiding tempering it. In the first cell or cells, the periphery of the glass sheet is moderately blown upon to create a slight peripheral prestressing. It is desired to obtain, in a zone with an approximate 15 mm width, a surface compression stress of a value between 60 and 250 kg/cm$^2$, which gives the glass in these areas an improved resistance to mechanical shocks as well as to thermal stresses during use.

In furnaces where the production runs are long, that is in which during long periods the same model of glazing is produced, devices such as that in FIG. 1 are satisfactory since the dimensions of the hood are adapted to that of the glazing. It is even possible to change the dimensions of the glazing slightly. An adjustment of the height of the hood or the upstream air pressure is, in general, sufficient to adapt the cooling hood to different glazings. But if it is desired to be able to greatly modify the dimensions between one windshield and the next one, this adjustment latitude is insufficient and the quality of the manufactured products suffer: if the blowing is too strong, there is a danger of causing deformations of the glass or breakages in the furnace, and, if the blowing is insufficient, the compression stress obtained is insufficient for obtaining the improvement in the desired resistance.

The present invention allows a large range of adjustments as well as an immediate modification of the latter, which allows the type of manufactured windshield to be changed instantaneously and even the manufacturing program to be modified in an impromptu manner in modifying the set-point values for blowing. The blowing adjustments at the time when the new glazing enters each blowing zone are then instantaneously adapted. Actually, modern furnaces are run by microprocessor, and setpoint values corresponding to each type of glazing are in the computer and can easily be called up.

FIG. 2 shows in a perspective view the operation of the process and apparatus of the invention. A metal frame (1) supports "skeleton" (2). Glass sheet (3) cut to its final dimensions is placed on the skeleton in a horizontal position, and the unit—glass sheet, skeleton and frame—is carried by a carriage (not shown) which successively transports the unit from one cell to another of the furnace. In the furnace are successive heating cells in which the glass reaches a uniform temperature, always the same whatever its shape or its thickness, then bending cells where heating is adapted to the desired deformation, the zones bent the most having to be hotter. On leaving the bending cells, the unit is carried by the carriage into the (or the first) blowing zone.

The blowing device, located in this zone is schematically shown in a perspective view in FIG. 2. A large duct (4) directs the air at a set temperature and flow rate onto the windshield. The air comes from one of the cooling cells located downstream and is mixed in proper proportions with fresh air taken from outside of the furnace to give it the set temperature, generally between 40° and 50° C. In FIG. 2, arrows (5) symbolize the airflow. The air arrives on a deflector (6) in the shape of a pyramid whose vertex it strikes. The base of deflector (6) has a contour which depends on the general shape of the glass sheets to be treated. In a preferred embodiment of the invention, the pyramid has a rectangular base, the angle at the vertex that the small side faces of the pyramid make with the axis of the pyramid is approximately 30°, that which the large side faces make with the pyramid axis is approximately 45°, resulting in air deflection by these angles from an initial air flow direction. To treat glazings whose dimensions can reach 190 cm × 110 cm, the dimension of the rectangle defined by the base of the pyramid will advantageously be approximately 90 cm × 50 cm.

In FIG. 3, the blowing device has been schematically shown as comprising an air duct (4), a pyramidal deflector (6) and airflow (5) guided by the duct and by the deflector. This air strikes glass sheet (3) which is represented as a plane for simplicity. A second position for a glass sheet of smaller dimension (7) is also shown. The latter is correctly blown on by decreasing its distance from deflector (6) as compared to pane (3). In this way, the zone blocked from the airflow is reduced in size in relation to that of glass sheet (3). The principle of adapting blowing to the different glass dimensions is thus understood. But, in practice, all glass sheets are maintained approximately in the same plane, and the position of the deflector instead changes.

In FIG. 4 is shown another embodiment of the invention. There pyramidal deflector (6) and air intake duct (4) remain unchanged but the duct (4) is equipped with a skirt (8) which is also in the shape of a truncated pyramid. The faces of the skirt (8) are preferably parallel to those of deflector (6) to form a gas flow passage therebetween. By moving one in relation to the other, in a parallel direction with axes of the pyramids, the flow of air can be modified.

The more complete embodiment of the invention is seen in FIG. 5. The unit of the blowing system made of stainless steel sheets is placed in a blowing cell of a bending furnace. It is suspended from a metal structure (10) connected to the frame of the furnace. The air flow arrives through stationary duct (9) at a set pressure and temperature. It then passes in an initial air flow direction (30) through a flexible duct (11) before arriving in air duct (12) having skirt (13). Air duct (12) and skirt (13) can be vertically moved along their common axis (32) by rods (14) controlled by mechanical moving means (15) such as fluidic cylinders, although racks, endless screws, etc. can also be used. These mechanical means are themselves attached to frame (10). The air leaving duct (12) strikes the vertex of pyramidal deflector (16) held by rods (17) to lifting means (18), and so is diverted or deflected in a deflection direction having a radially outward component.

Between the skirt (13) and pyramidal deflector (16) are two flap units (19), each in the shape of a truncated pyramid, which are each independently equipped with similar means of movement along common axis (32). If necessary, other flap systems could also be provided.

In this preferred embodiment of the invention, there are several identical pyramidal shapes coaxially fitting into one another. Each can move vertically, independently of the others. Their shapes are such that if deflector (16) were in its highest position and skirt (13) in its lowest position, the four pyramids would come into close contact with each other.

All of the moving means such as the fluidic cylinders in this embodiment can be independently controlled by a computer having CPU (34) and Memory (36) storing position data for glass sheets of different sizes and shapes.

The following operating sequence may be used: deflector (16) is first placed at such a distance from the glass that blowing is carried out in the desired zone of the windshield. The height of skirt (13) is then adjusted so that a flow passage section for the blowing air is defined which allows the desired cooling rate—therefore the stress state—to be obtained. The last adjustment is that of flap systems (19), allowing the air jets to be precisely directed.

In modern industry, and this is the case in manufacturing automobile glazings, in particular windshields, the problems of achieving a rapid response to market demand while limiting stocks as much as possible have become decisive. It is therefore essential to be able to have extremely flexible production tools, i.e., which instantaneously adapt to the demand Furnaces of thermal bending by gravity have therefore been developed with a very slight temperature lag. These furnaces, for example, the one which is described in French patent application No. FR 87-16 083, allow for successive productions of glazing with very different features of thickness, color or dimension. Modifying a manufacturing program at the last minute can even be accomplished by inserting a new carriage in the middle of a train of carriages waiting at the furnace input. The reaction time of such furnaces is so short that, in general, the bending of a new glazing is carried out without problem It is therefore particularly important to have a blowing process which also adapts itself to improvising.

The process and apparatus of the invention allows the system to react instantaneously to a command modifying the program of the order of passage of different glazings in the furnace. The process is carried out in the following manner: Following preliminary tests, an optimal adjustment of the four truncated pyramids of FIG. 5 is defined for each dimension of windshield. The position of pyramidal deflector (16) is first defined; it forms a relatively quiescent region which covers the central part of the glazing that the blowing air will not reach, and it directs the air along a region traversed by the edges of the glass sheet, where the compression stressing should be the greatest. In case the shape of the deflector does not correspond exactly to the shape of the glazing, for example, because the ratio of the length/width dimensions of its base is very different from the of the length/width ratio of the glazing itself, the deflector can be moved closer or farther relative to the glazing to blow on the four edges. The best conditions may be found by adjustment of flow and air speed.

Alternatively, the best blowing conditions will be found by adjusting the height of duct (12) bounded by skirt (13) and the upstream air pressure. The last parameters to be determined are the respective heights of intermediate flaps (19). They will provide good pressure distributions in the blowing zone. Optional working conditions for each type of glazing including the corresponding adjustments of all lifting means such as (15) or (18), are stored in the memory (36) of the furnace duct computer.

When a new type of glazing leaves the bending cell (or the buffer cell, if one exists) and enters the blowing cell, instructions are given to the furnace duct computer to adjust the lifting means such as (15) and (18) to stored values corresponding to the glazing in question. Thus, the blowing process will be automatically adjusted and the object sought will be attained. Whatever may be the order of succession of different glazings following one another the blowing best adapted to the glazing in question can automatically be provided.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for blowing gas on a glass sheet as to create a compression stress on the periphery of the glass sheet, comprising:
   a duct connected to a source of gas flow, a downstream end of the duct, in a direction of the gas flow, being positioned for directing the gas flow issuing therefrom onto a glass sheet; and
   a pyramidal deflector having an axis extending substantially parallel to the direction of gas flow with the vertex of the pyramidal deflector being positioned to the upstream in the direction of gas flow, said pyramidal deflector being positioned, relative to the duct so as to divert the gas flow issuing from said duct along sides of said pyramidal deflector, whereby the gas flow is diverted from a central portion of the glass sheet to the periphery of the glass sheet, whereby said central portion is covered by the deflector and is cooled at a lower rate than is said periphery.

2. The apparatus of claim 1 wherein the axes of said duct and said deflector are substantially parallel, including means for moving at least one of said duct and said deflector along the respective axes thereof.

3. The apparatus of claim 2 wherein said means for moving comprise means for moving said deflector, whereby a distance between said deflector and the glass sheet may be adjusted.

4. The apparatus of claim 1 wherein the axes of said duct and said deflector are substantially colinear and wherein said downstream end of said duct comprises a truncated pyramidal skirt surrounding said deflector.

5. The apparatus of claim 4 including means for adjusting a separation of said skirt and said deflector along said axes whereby a size of a gas flow passage therebetween can be adjusted.

6. The apparatus of claim 5 including at least one truncated pyramidal flap in said flow passage, and means for moving said at least one flap along said axes.

7. The apparatus of claim 6 wherein said means for adjusting a separation of said skirt and said deflector comprise means for moving at least one of said skirt and said deflector along said axes.

8. The apparatus of claim 7 including separate means for moving both said skirt and said deflector along said axes.

9. The apparatus of claim 8 including electronic control means for individually controlling said respective means for moving said duct, said skirt and said at least one flap to predetermined positions along said axes.

10. The apparatus of claim 9 wherein said electronic control means include memory means for storing said predetermined positions for glass sheets of different configurations.

11. The apparatus of claim 5 including means for supporting the glass sheet for cooling by gas flow diverted by said deflector.

12. A process for cooling glass sheets while creating compression stresses on the periphery thereof, comprising the steps of:

causing a gas to flow in an initial gas flow direction;
using deflecting means for deflecting said gas to flow in a deflected direction having a radially outward component with respect to said initial gas flow direction so that a region downstream from said deflecting means receives a reduced gas flow as compared to a region along said deflected gas flow; and positioning a glass sheet downstream of said deflecting means and at a position such that only the periphery of the glass sheet receives said deflected gas flow while a central portion of said glass sheet is covered by said deflector.

13. The process of claim 12 including the step of adjusting a distance in said gas flow direction between said deflecting means and the glass sheet.

14. The process of claim 12 wherein said deflecting means comprises a pyramidal defector surrounded by a truncated pyramidal skirt to form a flow passage, including the step of varying the distance between said deflector and said skirt to vary the size of said flow passage.

15. The process of claim 14 including the step of guiding gas in said flow passage by adjusting a position of a truncated pyramidal flap in said flow passage.

16. The process of claim 12 wherein said deflected direction makes an angle of at least 30° with respect to said initial gas flow direction.

* * * * *